United States Patent
Willför et al.

(10) Patent No.: US 10,888,998 B2
(45) Date of Patent: Jan. 12, 2021

(54) METHOD AND DEVICE FOR VERIFYING ONE OR MORE SAFETY VOLUMES FOR A MOVABLE MECHANICAL UNIT

(71) Applicant: ABB Schweiz AG, Baden (CH)

(72) Inventors: Per Willför, Västerås (SE); Roger Kulläng, Västerås (SE); Roger Mellander, Vasteras (SE)

(73) Assignee: ABB Schweiz AG, Baden (CH)

(*) Notice: Subject to any disclaimer, the term of this patent is extended or adjusted under 35 U.S.C. 154(b) by 610 days.

(21) Appl. No.: 14/914,695

(22) PCT Filed: Oct. 7, 2013

(86) PCT No.: PCT/EP2013/070773
§ 371 (c)(1),
(2) Date: Feb. 26, 2016

(87) PCT Pub. No.: WO2015/051815
PCT Pub. Date: Apr. 16, 2015

(65) Prior Publication Data
US 2016/0207198 A1    Jul. 21, 2016

(51) Int. Cl.
*B25J 9/16*        (2006.01)
*G05B 19/4061*    (2006.01)

(52) U.S. Cl.
CPC .......... *B25J 9/1676* (2013.01); *G05B 19/4061* (2013.01); *Y10S 901/14* (2013.01)

(58) Field of Classification Search
None
See application file for complete search history.

(56) References Cited

U.S. PATENT DOCUMENTS 7,298,385 B2    11/2007    Kazi et al.
8,326,590 B2    12/2012    Kock et al.
(Continued)

FOREIGN PATENT DOCUMENTS

EP    1435280 A2    7/2004

OTHER PUBLICATIONS

Grahn, Sten et al., "TCP Position Tolerances in Joint Torque Minimizations", 1998, Proceedings of the 1998 IEEE/RSJ Intl. Conference on Intelligent Robots and Systems, IEEE.*
(Continued)

*Primary Examiner* — Cedric Johnson
(74) *Attorney, Agent, or Firm* — Whitmyer IP Group LLC (57) ABSTRACT

A method and a device for verifying one or more safety volumes for a movable mechanical unit positioned in an environment, wherein a world-coordinate system is defined in relation to the mechanical unit and in relation to the environment of the mechanical unit. The method includes storing a description of one or more safety volumes defined in relation to the world-coordinate system, and repeatedly determining position and orientation of a portable display unit in relation to the world-coordinate system, determining a graphical representation of the safety volumes based on the description of the safety volumes and the position and orientation of the portable display unit, overlaying the graphical representation of the safety volumes on a view of the real mechanical unit and its environment to provide a composited augmented reality image, and displaying the augmented reality image on the portable display unit.

17 Claims, 6 Drawing Sheets

(56) References Cited

U.S. PATENT DOCUMENTS

| | | |
|---|---|---|
| 2002/0133264 A1 | 9/2002 | Maiteh et al. |
| 2004/0189631 A1* | 9/2004 | Kazi .................. B25J 9/1671 |
| | | 345/418 |
| 2005/0149231 A1 | 7/2005 | Pretlove et al. |
| 2005/0251290 A1 | 11/2005 | Skourup et al. |
| 2005/0256611 A1 | 11/2005 | Pretlove et al. |
| 2006/0241792 A1 | 10/2006 | Pretlove et al. |
| 2006/0241793 A1 | 10/2006 | Skourup et al. |
| 2009/0300535 A1 | 12/2009 | Skourup et al. |
| 2013/0041368 A1 | 2/2013 | Cunningham et al. |
| 2013/0116828 A1 | 5/2013 | Krause et al. |

OTHER PUBLICATIONS

Corrales, J.A.., et al., "Safe Human-Robot Interaction Based on Dynamic Sphere-Swept Line Bounding Volumes", 2011, Robotics and Computer-Integrated Manufacturing 27, Elsevier, Ltd. (Year: 2011).*

Borgolte, Ulrich et al., "Online Collision Avoidance for Two Robots in 3D-Space", Jul. 26-30, 1993, Proceedings of the 1993 IEEE/RSJ International Conference on Intelligent Robots and Systems, IEEE. (Year: 1993).*

International Search Report and Written Opinion of the Internation Searching Authority Application No. PCT/EP2013/070773 Completed: May 12, 2014; dated May 19, 2014 9 pages.

* cited by examiner

METHOD AND DEVICE FOR VERIFYING ONE OR MORE SAFETY VOLUMES FOR A MOVABLE MECHANICAL UNIT

TECHNICAL FIELD

The present invention relates to a method for verifying one or more safety volumes for a movable mechanical unit with respect to an environment of the mechanical unit in order to avoid collisions between the mechanical unit and obstacles in the environment. The present invention also relates to a device for verification of the safety volumes.

BACKGROUND

The movable mechanical unit is, for example, an industrial robot, a positioner or other types of manipulators. Industrial robots and other types of manipulators are often programmed to move in an environment including a plurality of obstacles, for example, walls, fences, machines, positioners, workstations of different types, and other movable mechanical units, such as robots, manipulators, and external axes. To ensure that the robot does not collide with obstacles in its environment, it is known to determine one or more safety volumes for the robot. The safety volumes are defined with reference to a world coordinate system defined in relation to the robot and its environment. One type of safety volume has a fixed size and a fixed position in relation to the environment of the robot. In the following, this type of safety volume is named fixed safety volumes. Such fixed safety volumes are also called safety zones. The fixed safety volumes are predefined. The fixed safety volume can either be defined so that the robot is not allowed to move outside the safety volume, or so that the robot is not allowed to move inside the safety volume. A robot may have several fixed safety volumes. The fixed safety volumes are determined or programmed in advance, for example, during programming of the robot. The fixed safety volumes are often determined numerically and visualized on a PC screen in 2D. If the robot is programmed off-line in a programming and simulation tool, the fixed safety volumes can be programmed and visualized in the programming and simulation tool. During operation of the robot, a safety system supervises the movements of the robot. If the safety system detects that the robot is moved outside a fixed safety volume where such movement is not allowed, the robot is immediately stopped.

Another type of known safety volume has a variable size and a variable position in relation to the environment of the robot and is defined in relation to a critical part of the robot. The critical part is, for example, the Tool Centre Point (TCP) of the robot or an elbow of the robot. In the following, this type of safety volume is named moving safety volume. A robot may have several moving safety volumes defined for different parts of the robot. A moving safety volume is also called a movement zone. The moving safety volume is defined as the maximum volume which can be reached by the critical part at a certain moment if the robot is emergency stopped. The moving safety volume depends on the movement path of the robot and takes account of braking paths and maximum position which can be reached by the robot for that movement path. The size of the moving safety volume depends on the velocity and load of the critical part and the braking characteristics of the robot. The higher velocity of the critical part, the larger is the size of the moving safety volume. The position of the moving safety volume depends on the position of the critical part. The moving safety volumes can be used to check for collisions between critical parts of the robot and moving obstacles in the environment of the robot during execution of the robot.

U.S. Pat. No. 8,326,590B2 discloses a method and a system for designing and checking fixed safety volumes of a robot. The fixed safety volumes are established with the aid of off-line simulations, in which the movements of the robot is simulated. The off-line simulations are carried out by an off-line programming and simulation tool (Robot Studio on PC). During a first step of the design of the fixed safety volumes, the fixed safety volumes are visualized on a screen on the off-line programming and simulation tool, and it is possible for the programmer to modify the fixed safety volumes based on the visualization. In a second step, the designing of the fixed safety volumes takes into account the braking path of the robot when the robot is stopped. This is done by calculating a virtual moving safety volume for the robot based on off-line simulations of the movement path of the robot and checking for collisions between the fixed safety volumes and the virtual moving safety volume. If a collision is detected, the fixed safety volumes and/or the robot path are modified. Thereafter data about the fixed safety volumes are transferred to the robot controller.

When the fixed safety volumes have been determined, a description of the fixed safety volumes is deployed to the safety system of the robot. The description may contain coordinates of the fixed safety volumes defined in the world coordinate system. The coordinates of the fixed safety volumes are often fed manually to the safety system, for example, by the robot programmer. This means that the coordinates of the fixed safety volumes are manually fed to the safety system of the robot.

Since it is hard for a human to imagine how a safety volume defined in a 2D layout will end up in a robot environment, it is necessary to verify that the volumes are correctly defined in relation to the robot and its environment. Thus, when the safety volumes have been deployed to the safety system, the positions of the safety volumes are verified in connection to the robot and its environment. This is done manually by repeatedly moving the robot in different directions until the robot reaches the borderlines of the safety volumes and the robot is stopped by the safety system. The safety volumes can be incorrect due to several reasons. One reason is that the some of the coordinates fed to the safety system are incorrect. Another reason is that positions and shapes of predefined fixed safety volumes do not fit correctly to the obstacles in the environment of the robot. A problem is that the manual verification of the safety volumes is error prone and time consuming. This is particularly a problem for a line including several robots, each robot having one or more safety volumes to be verified. The validation process of the safety volumes can take several days, and if an error is found during the validation, the safety volumes needs to be re-deployed and the entire validation process needs to restart. This means that lots of time potentially is wasted for the programmer/customer. To make matter worse, the person defining the safety volumes is not always the same person who is carrying out the validation.

SUMMARY

The object of the present invention is to provide a method for facilitating verification of safety volumes for a movable mechanical unit with respect to the environment of the mechanical unit.

According to one aspect of the invention, this object is achieved by a method as defined in the invention.

The method is characterized in that it comprises
obtaining a description of one or more safety volumes, the description being defined in relation to the world coordinate system, and repeatedly:
determining position and orientation of a portable display unit in relation to the world coordinate system,
determining a graphical representation of the safety volumes based on the description of the safety volumes and the position and orientation of the portable display unit,
overlaying the graphical representation of the safety volumes on a real view of the environment of the mechanical unit to provide a composited augmented reality image, and
displaying the augmented reality image on the portable display unit.

With a safety volume is meant a volume defined in relation to the mechanical unit or the environment of the mechanical unit in order to avoid collisions between the mechanical unit and obstacles in the environment during movement of the mechanical unit.

According to the invention, the safety volumes are presented in a graphical view on top of the real environment of the mechanical unit on a display unit. The method according to the invention enables a user to walk around in the environment of the mechanical unit and view a graphical representation of the safety volumes overlaid the real mechanical unit and its environment. By moving the display unit around in the environment of the mechanical unit, the user will be able to look at the environment and the safe volumes from different angles, which increases the comprehension of the safety volumes and how they are related to obstacles in the environment. The invention gives the user valuable feedback on how and where in the environment the volumes are defined. The invention makes it is possible to detect if the shape or position of the safety volume needs to be modified in order to avoid collisions with obstacles in the environment of the mechanical unit. Incorrect safety volumes can be modified and incorrectly fed coordinates can be corrected upon detecting them. The invention makes it is possible to detect if velocities and/or positions of the mechanical unit on the programmed path need to be modified in order to avoid collisions with obstacles in the environment of the mechanical unit.

According to an embodiment of the invention, at least one of said safety volumes is a fixed safety volume. With a fixed safety volume is meant a volume having a fixed position and orientation in the world-coordinate system. The fixed safety volume is presented in a graphical view on top of the real environment and enables a user to walk around in the environment and view the graphical representation of the fixed safety volume in relation to the real environment from different angles, which increases the comprehension on how and where in the environment the fixed safety volumes are defined. Any error due to misunderstanding of the numerical parameters is easy detectable, e.g. wrong direction of volume extension. Thus, it is easy for the user to detect if any of the fixed safety volumes is incorrect and needs to be modified. For example, it is possible to detect if any of the coordinates of the fixed safety volume have been fed incorrect to the safety system. Programming and verification of the fixed safe modules will be more intuitive and faster, since the comprehension of the fixed safety volumes are dramatically improved, and since major programming errors easily can be detected. Thus, this embodiment of the invention facilitates verification of the fixed safety volumes, and thereby reduces the time needed for carrying out verification of the fixed safety volumes. The method according to the invention can be used for verification of the safety volumes during designing and programming of the safety volumes, as well as during the last verification step on site. Further, the method according to the invention makes it possible to define and program fixed safety volumes on site.

According to an embodiment of the invention, the method comprises a first verification step including verifying the safety volumes based on the displayed augmented reality image and modifying the safety volumes upon detecting an incorrect safety volume.

According to a further embodiment of the invention, the method comprises a second verification step including repeatedly moving the mechanical unit in different directions until the mechanical unit reaches the borderlines of the fixed safety volumes and modifying the fixed safety volumes upon detecting an incorrect safety volume. Due to safety reasons, the method according to the invention cannot entirely replace the above described method for verification of fixed safety volumes including repeatedly moving the mechanical unit in different directions until the mechanical unit reaches the borderlines of the safety volumes. However, by using the method according to the invention as a pre-verification step, it is possible to significantly reduce the errors detected during the final verification step, and accordingly it is possible to significantly reduce the total time for verification of the fixed safety volumes.

According to an embodiment of the invention, at least one of said safety volumes is a moving safety volume having a size and position that depends on the velocity and position of a critical part of the mechanical unit, and the method comprises repeatedly obtaining position and velocity of the critical part of the mechanical unit, determining the moving safety volume for the critical part of the mechanical unit based on the position and velocity of the critical part, storing a description of the moving safety volume defined in relation to the world-coordinate system, determining a graphical representation of the moving safety volume based on the stored description of the safety volumes and the position and orientation of the portable display unit, overlaying the graphical representation of the moving safety volume on a view of the real environment of the mechanical unit to provide a composited augmented reality image, and displaying the augmented reality image on the portable display unit. Preferably, the moving safety volume is determined based on the position, velocity and load of the critical part. This embodiment makes it possible to visualize how the size and position of a moving safety volume changes with respect to the real environment of the mechanical unit while the mechanical unit is moving along a programmed path. This embodiment enables a user to detect if there is a collision between a moving safety volume and an obstacle in the real environment of the mechanical unit. This embodiment facilitates verification of a programmed movement path with regard to collisions with fixed obstacles in the environment of the mechanical unit.

A moving safety volume represents a minimum safety distance in each direction from the critical part, which safety distance should be upheld in order to avoid collisions with obstacles in the environment of the mechanical unit. The size and position of the moving safety volume depends on a programmed path for the mechanical unit. According to this embodiment of the invention, the size and position of the moving safety volume along the programmed path is presented in a graphical view on top of the real environment. The robot program can, for example, be executed on a real robot while a moving safety volume for a critical part of the robot is determined based on the position, velocity, and possibly the load, of the real robot. A graphical presentation of the moving safety volume enclosing the critical part of the real mechanical unit is presented in relation to the real environment of the mechanical unit. This embodiment of the invention enables a user to visually determine if there is any overlap between the moving safety volume and an obstacle, such as a fence or a work station, in the environment of the mechanical unit. If there is an overlap between the moving safety zone and the obstacle, there is a risk for collision between the mechanical unit and the obstacle. Then the path of the mechanical unit has to be reprogrammed. Thus, this embodiment of the invention makes it possible to verify a programmed movement path with regard to collisions in the real environment of the mechanical unit.

In one embodiment of the invention, only the current moving safety volume is presented. This means that the moving safety volume is moved around in the real environment in dependence on the position and velocity of the mechanical unit along the programmed path. In an alternative embodiment of the invention, the current moving safety volume is presented together with the previously determined moving safety volumes along the path, and possible also together with future moving safety volumes, which are to be executed later on the path. Thus, all moving safety volumes along the path are presented at the same time. This embodiment facilitates for the programmer to verify a programmed movement path with regard to collisions in the real environment of the mechanical unit.

According to an embodiment of the invention, the method comprises simulating a programmed movement path for the mechanical unit, determining position and velocity of the critical part along the movement path based on the simulation, and determining the moving safety volume based on the determined position and velocity of the critical part. Preferably, the load of the critical part is also considered. Instead of executing a movement program on the real mechanical unit, it is possible to simulate the movement path, for example in the safety system of the mechanical unit, in order to determine the position, velocity and load of the critical part along the movement path. The size and position of the moving safety volume is then determined based on the position and velocity of the critical part obtained from the simulation. This embodiment makes it possible to verify a programmed movement path with regard to collisions in the real environment of the mechanical unit without moving the mechanical unit. The graphical presentation of the moving safety volume is moved along the programmed path in the real environment, while the mechanical unit does not have to be moved. Due to the fact that the mechanical unit does not have to be moved, it is safe for the user to walk around in the environment of the mechanical unit, and accordingly it is easier for the user to detect overlap between the moving safety volume and obstacles in the environment. Thus, verification of the programmed path is further facilitated.

According to an embodiment of the invention, the method comprises calculating a safety distance for said critical part based on the velocity and load of the critical part, and determining said moving safety volume based on the calculated safety distance. The safety distance is the maximum distance in a certain direction the mechanical unit can reach if it is emergency stopped at a certain point on the programmed path.

According to an embodiment of the invention, at least one of said volumes is a fixed safety volume and at least one is a moving safety volume, and the method comprises repeatedly determining a graphical representation of the fixed safety volume and the moving safety volume based on the descriptions of the safety volumes and the position and orientation of the portable display unit, overlaying the graphical representation of the fixed safety volume and moving safety volume on said view of the environment to provide a composited augmented reality image, and displaying the augmented reality image on the portable display unit. By displaying the fixed safety volume in the same view as the moving safety volume it is possible to visually verify the position of a fixed safety volume in relation to the movement path. Depending on the positional relation between the fixed and movable safety volumes it is possible for a user to detect improvements of the fixed safety volumes and make necessary modifications of the fixed safety volume. Thus, this embodiment facilitates verification of the position of fixed safety volumes in relation to a programmed movement path.

According to an embodiment of the invention, the method comprises detecting user interactions with the graphical representation of the fixed safety volume, and modifying the stored description of the fixed safety volume based on said detected user interactions. The interaction can, for example, be made directly on the screen of the display unit, or by gestures in the air in front of a pair of interactive glasses. This embodiment makes it possible for a user to modify fixed safety volumes on site during on-line verification of the safety volumes and accordingly reduce the time needed for verification and modification of the fixed safety volumes.

According to an embodiment of the invention, the display unit can be transparent and allow a user to see the real world through the display unit. In this embodiment, the display unit preferably can be integrated into a pair of glasses.

According to another embodiment of the invention, the method comprises capturing an image of the real mechanical unit and its environment, and registering the graphical representations of the safety volumes on the image of the real mechanical unit and its environment to provide the composited augmented reality image. This embodiment makes it possible to use a portable handheld unit, such as a handheld computer or a cellphone, including a display unit. However, it is also possible to integrate the display unit into a pair of glasses.

According to another embodiment of the invention, 2D graphical representations of the safety volumes are determined based on a 3D descriptions of the safety volumes and the position and orientation of the portable display unit, and the 2D graphical representations of the safety volumes are registered on the image of the real mechanical unit and its environment to provide a composited augmented reality image. This embodiment makes it possible to view a 2D augmented reality image on the display unit.

According to one aspect of the invention, the object is achieved by a device as defined in the invention.

The device is characterized in that it comprises a storage unit configured to store descriptions of the safety volumes, a portable display unit, a position detector configured to continuously determine position and orientation of the portable display unit in relation to the world coordinate system, a graphical unit configured to determine graphical representations of the safety volumes based on the stored descriptions of the safety volumes and the position and orientation of the portable display unit, and an augmented reality unit configured to overlay the graphical representation of the safety volumes on a view of the real world to provide a composited augmented reality image, and to display the augmented reality image on the portable display unit.

According to an embodiment of the invention, the device comprises a description generator configured to obtain position and velocity of a critical part of the mechanical unit, to determine a moving safety volume for the critical part of the mechanical unit based on the position and velocity of the critical part, and to store a description of the moving safety volume defined in relation to the world coordinate system in said storage unit. The position and velocity of the critical part can, for example, be received or retrieved from a control unit of the mechanical unit or from a simulator unit.

According to an embodiment of the invention, the device comprises a simulation unit configured to simulate a programmed movement path for the mechanical unit, and to determine the position and velocity of the critical part during execution of the movement path based on the simulation, and said description generator is configured to obtain the position and velocity of the critical part from the simulation unit and to determine said moving safety volume based on the obtained position and velocity.

According to an embodiment of the invention, said storage unit is configured to store descriptions of fixed safety volumes having fixed position in relation to the world-coordinate system, said graphical unit is configured to determine graphical representations of the fixed safety volumes and the moving safety volumes based on the descriptions of the safety volumes, and the position and orientation of the portable display unit, and the augmented reality unit configured to overlay the graphical representations of the fixed and moving safety volumes on the view of the real mechanical unit and its environment to provide a composited augmented reality image.

According to an embodiment of the invention, the device comprises an interaction unit configured to detect user interactions with the graphical representation of the fixed safety volumes, and a modification unit configured to modify the stored description of the fixed safety volumes based on detected user interactions with the graphical representation of the safety volume. For example, the display unit may include a touch screen configured to detect user interactions with the graphical representation of the safety volume.

According to an embodiment of the invention, the device comprises a camera configured to capture an image of the real mechanical unit and its environment, and the augmented reality unit is configured to register the graphical representations of the safety volumes on the image of the real mechanical unit and its environment to provide a composited augmented reality image.

According to an embodiment of the invention, the graphical unit is configured to determine 2D graphical representations of the safety volumes based on the 3D descriptions of the safety volumes and the position and orientation of the portable display unit, and the augmented reality unit is configured to register the 2D graphical representations of the safety volumes on the image of the real mechanical unit and its environment to provide a composited augmented reality image.

The device according to the invention is advantageously used for verification of safety volumes for an industrial robot.

BRIEF DESCRIPTION OF THE DRAWINGS

The invention will now be explained more closely by the description of different embodiments of the invention and with reference to the appended figures.

DETAILED DESCRIPTION

In the following examples, the mechanical unit is robot. However, the invention is not limited to robots. The mechanical unit can be any type of mechanical unit whose movements are programmable, such as a robot, a manipulator, a positioner, and an external axis.

Figure 1:
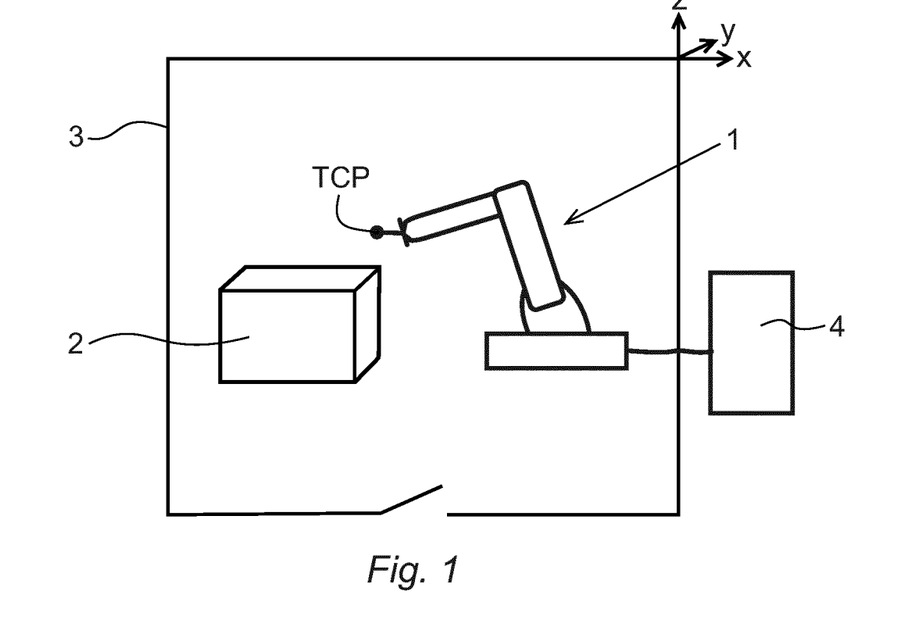
FIG. 1 shows an example of a robot cell including a robot.

FIG. 1 shows an example of a robot cell including a mechanical unit in the form of a robot 1, a machine 2 tended by the robot, and a fence 3 surrounding the robot cell. A world coordinate system (x,y,z) is defined in relation to the environment of the robot, in this example, in relation to the robot cell. The positions of the robot and the machine are defined in relation to the world coordinate system. The robot 1 is connected to a robot controller 4 including a processor coupled to a memory. One or more fixed safety volumes are defined with reference to the world coordinate system. The fixed safety volumes have fixed sizes and fixed positions in relation to the world coordinate system. The fixed safety volume can either be defined so that the robot is not allowed to move outside the safety volumes, or so that the robot is not allowed to move inside the safety volume. A robot may have several fixed safety volumes. The fixed safety volumes are determined or programmed in advance, for example, during programming of the robot.

The robot includes a safety system adapted to supervise the motions of the robot and to detect if the robot moves outside or inside the fixed safety volumes. In this example, the safety system is run on the robot controller. It is also possible to have the safety system run on a separate safety computer connected to the robot controller. When one or more fixed safety volumes have been defined and verified for a robot, a description of the fixed safety volumes is stored in a database in the safety system of the robot. The description may contain coordinates of the fixed safety volumes defined in the world coordinate system. The safety system may obtain the descriptions of the fixed safety volumes from an off-line programming tool, or from a user feeding the descriptions to the safety system. The safety system detects if the robot or one or more critical parts of the robot is moved outside/inside the safety volumes. The safety system immediately stops the robot motions if a critical part of the robot is outside/inside the fixed safety volume. The critical part is, for example, a Tool Center Point (TCP) of the robot, an elbow if the robot is a 7-axes robot, or the entire volume of the robot.

Figure 2:
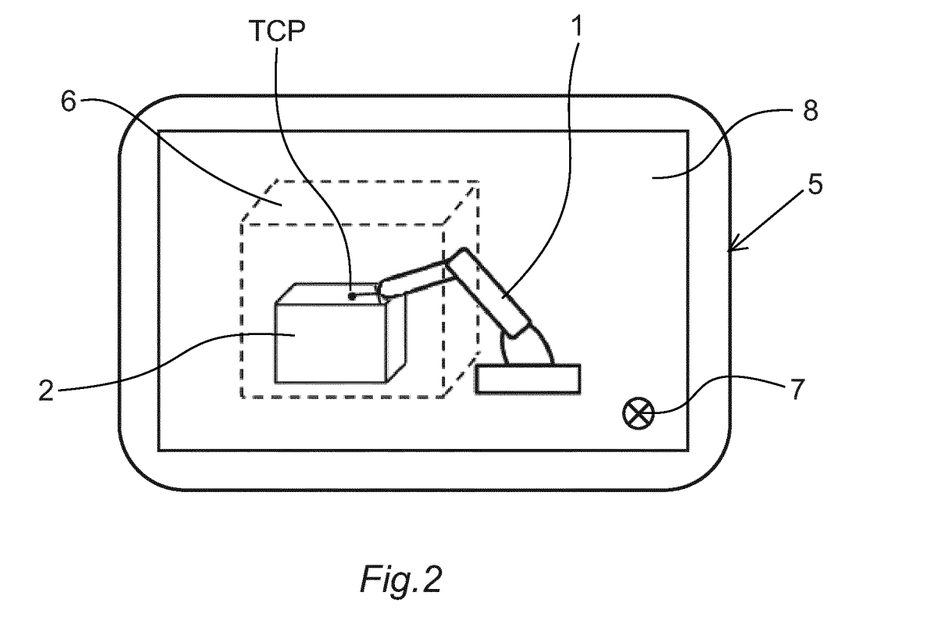
FIG. 2 shows an example of a display unit displaying an augmented reality image including a graphical representation of a fixed safety volume presented on top of the robot cell shown in FIG. 1.

FIG. 2 shows an example of a portable display unit 5 displaying an augmented reality image including a graphical representation of a fixed safety volume 6 presented on top of the robot cell shown in FIG. 1. The portable display unit 5 includes a screen 8 for displaying augmented reality images. The portable display unit 5 may also include data processing means, such as a CPU or FPGA, and storage means, such as RAM, ROM, PROM etc. for storing data and programs. The portable display unit 5 is, for example, a Teach Pendant Unit (TPU), a portable computer unit, tablet computer, a cell phone, wearable glasses, or a head-mounted display, see-though spectacles including a transparent screen, or spectacles including an opaque screen. A position vector 7 is defined orthogonal to the surface of the screen 8 of the display unit 5. The position vector 7 depends on the position and orientation of the screen 8 of the display unit with reference to the world coordinate system.

Figure 3:
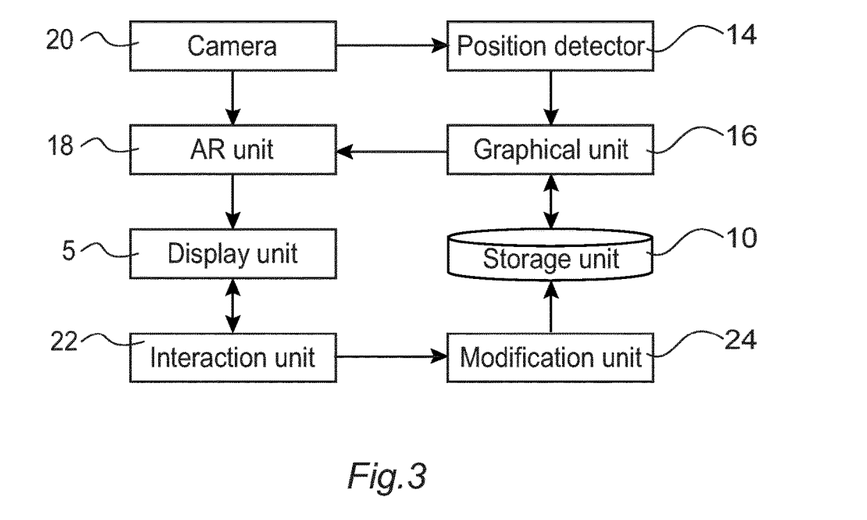
FIG. 3 shows a block diagram of a device for verifying safety volumes according to a first embodiment of the invention.

FIG. 3 shows an example of a device according to the invention for use in connection with verifying fixed safety volumes for movable mechanical units. The device comprises a portable display unit 5 including a screen for displaying augmented reality images. The screen is, for example, a touch screen or a transparent screen. The device further comprises a storage unit 10, such as RAM, ROM, PROM, EEPROM, configured to store descriptions of the fixed safety volumes. The descriptions are defined in relation to the world coordinate system. For example, the descriptions include coordinates of safety volumes in the world coordinate system. The device may obtain descriptions of the fixed safety volumes from the safety system of the robot, from an off-line programming tool, or from a user interface to which a user feds the descriptions.

The device further comprises a position detector 14 configured to continuously determine the position and orientation of the display unit 5. For example, the position detector 14 determines a position vector in relation to the world coordinate system for the portable display unit. The device further comprises a graphical unit 16 configured to determine graphical representations of the fixed safety volumes based on the stored descriptions of the fixed safety volumes and the position vector of the portable display unit 5. The device further comprises an augmented reality unit 18 configured to overlay the graphical representation of the safety volumes on a view of the real world to provide a composited augmented reality image, and to display the augmented reality image on the portable display unit 5. Preferably, the storage unit 10, the position detector 14, the graphical unit 16, and the augmented reality unit 18 are implemented as a part of the portable display unit 5. The graphical unit 16 and the augmented reality unit 18 are software modules, which preferably are run on a processor of the display unit 5.

In this embodiment, the screen of the display unit 5 is opaque, i.e. not of see-through type, and the device further includes a camera 20 configured to capture an image of the real robot and its environment, and the augmented reality unit 18 is configured to register the graphical representations of the safety volumes on the image of the real robot and its environment to provide the composited augmented reality image. The display unit 5 visualizes the view of the camera 20 combined with computer generated graphics of the safety volumes. The camera 20 is preferably mounted on or integrated in the display unit 5. All types of cameras can be used, but the demand for accuracy of position and orientation determines the type of camera. For example, a web camera, a video camera, or a CCD camera could be used. However, the camera is optional. The camera is not necessary if see-through glasses are used and the position and orientation of the display unit are determined using any other type of sensor.

The position detector 14 is configured to determine the position and orientation of the display unit 5 in relation to the world coordinate system. The position and orientation of the display unit can be tracked in a number of different ways. In this embodiment of the invention, the position detector 14 is configured to determine the position vector of the display unit based on the images received from the camera 20. The position and orientation of the display unit is, for example, determined by image recognition. In another embodiment, the display unit could be provided with a sensor for determining the position and orientation. Examples of sensors and technologies for determining positions and orientations are computer vision, inertial sensing, ultrasonic sensing, and magnetic sensing, accelerometers, gyros, laser technology, and Global Positioning System (GPS).

In one embodiment of the invention, the graphical unit 16 is configured to determine 2D graphical representations of the safety volumes based on the 3D descriptions of the safety volumes and the position vector of the portable display unit, and the augmented reality unit is configured to register the 2D graphical representations of the safety volumes on the image of the real robot and its environment to provide a composited augmented reality image. In another embodiment of the invention, 3D graphical representations of the safety volumes are presented on the display unit.

Optionally, the device may include an interaction unit 22 configured to detect user interactions with the graphical representation of the fixed safety volumes, and a modification unit 24 configured to modify the stored description of the fixed safety volumes based on detected user interactions. The display unit may include a touch screen and the interaction unit detects user interactions with the graphical representation on the touch screen. The interaction can, for example, be made directly on the screen of the display unit, or by gestures in the air in front of a pair of interactive glasses. For example, the user is allowed to move a point on the safety volume by drag and drop, and to enlarge and reduce the size of a safety volume by moving one or more fingers over the screen. This embodiment makes it possible for a user to modify fixed safety volumes on site during on-line verification of the safety volumes, and accordingly to reduce the time needed for verification and modification of the fixed safety volumes.

In the following, some examples of possible ways to implement the position detection will be described. When talking about mobile augmented reality (AR) today, and AR implementations in general, the most widely adapted technology is marker tracking. This technology works by having the camera detect and track physical markers in the environment, and displaying virtual objects on the screen aligned to the markers. An advantage with this method is that it is easy to calculate the angle of the camera relative to the marker and align the virtual object accordingly, and it is simple to implement. Another technology which can be used is markerless AR. The markerless technology builds on the principle of natural feature tracking, which means that the device creates a visual understanding of an environment it had no previous knowledge of. This allows for new forms of AR applications where digital images are placed and aligned straight into the real environment without the need for physical markers. While both marker based and markerless AR technologies focus around the camera as the most important sensor, geo-location based AR focuses on the positioning sensors of the device such as the GPS, accelerometer, compass and gyroscope. By locating the position of the display unit relative to the real world, digital information of the safety volumes can be overlaid the real world to provide information position of the safety volume relative the robot and the surroundings.

Figure 4:
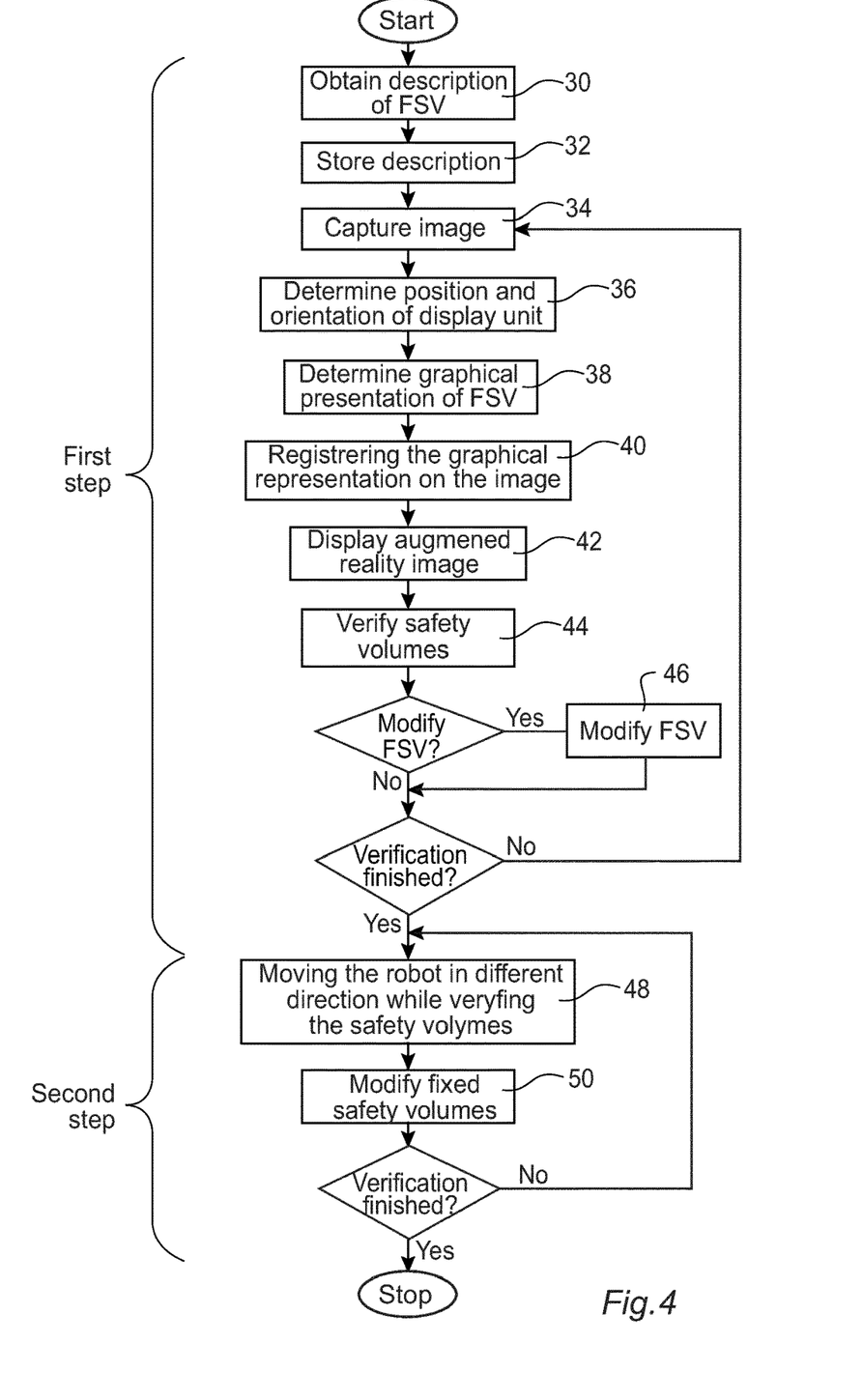
FIG. 4 shows a block scheme of a method for verifying safety volumes according to a first embodiment of the invention.

FIG. 4 shows a block scheme of a method according to a first embodiment of the invention for verifying fixed safety volumes (FSV). A fixed safety volume has a fixed size and a fixed position in relation to the environment of the mechanical unit. The method described is based on the use of a camera arranged to provide images of the robot and its environment. However, other methods can be used. A world coordinate system is defined in relation to the mechanical unit and in relation to the environment of the mechanical unit. The verification is made in two steps. The second verification step is optional.

One or more fixed safety volumes are defined for the movable mechanical unit. The first step includes obtaining a description of each of the fixed safety volumes, block 30. The descriptions are preferably 3D descriptions. The descriptions are defined in relation to the world coordinate system. The descriptions are, for example, obtained from the safety system of the robot. The descriptions are stored in the storage unit 10, block 32. During the first verification step, the following sub steps are repeatedly carried out:

Capturing an image of the real robot and its environment, block 34. The images are captured by the camera 20. This step is optional.

Determining the position and orientation of the display unit 5 in relation to the world coordinate system. Suitably a position vector of the screen of the display unit is determined based on the position and orientation of the display unit, block 36. In this embodiment, the position and orientation of the display unit 5 is determined based on the captured image of the real robot and its environment, for example, by means of marker tracking or markerless AR.

Determining graphical representations of the fixed safety volumes based on the stored description of the fixed safety volumes and the position vector of the portable display unit, block 38. This means that a graphical presentation of the fixed safety volumes seen from the present position and angle of the display unit is determined. 2D or 3D graphical representations of the fixed safety volumes are determined based on the descriptions of the fixed safety volumes and the position vector of the portable display unit.

Registering the graphical representation of the fixed safety volumes on the image of the real robot and its environment to provide a composited augmented reality image, block 40. This step is optional, and is not necessary if see-through glasses are used.

The augmented reality image is displayed on the portable display unit 5, block 42.

The first verification step further includes verifying the fixed safety volumes based on the displayed augmented reality image, block 44. During the first verification step, the user moves the display unit around in a robot cell and looks at the environment and the safe volumes from different angles. The displayed augmented reality image provides the user with feedback on how and where in the robot environment the fixed safety volumes are defined. Thus, it is easy for the user to detect if any of the fixed safety volumes is incorrect and needs to be modified. If errors are detected, the incorrect safety volumes are modified, block 46. Optionally, this step comprises detecting user interactions with the graphical representation of the fixed safety volume, and modifying the description of the fixed safety volume based on said detected user interactions. The interaction can, for example, be made directly on the screen of the display unit, or by gestures in the air in front of a pair of interactive glasses. Is it advantageous to run the first step again, block 34-44, after the fixed safety volumes have been modified to ensure that the modified safety volumes are correct. Steps 34-46 are repeated until the user determines that the verification is finished.

In order to finally verify the fixed safety volumes, a second verification step can be carried out. During the second verification step the robot is repeatedly moved in different directions until the robot reaches the borderlines of the fixed safety volumes, block 48. For example, the robot can be automatically moved in accordance with a verification program. The fixed safety volumes are modified upon detecting an incorrect safety volume, block 50. The modified safety modules must be verified. Preferably, the modified safety modules are verified by running the first and second verification step again.

A moving safety volume is defined in relation to a critical part of the robot and has a variable size and position in relation to the environment of the robot. One or more moving safety volumes can be defined for one mechanical unit. The critical part is, for example, the Tool Centre Point (TCP) of a robot or an elbow of the robot. The position of a moving safety volume depends on the position of the critical part, and the size of the moving safety volume depends on the current velocity and load of the critical part. The moving safety volume depends on a movement path of the robot. The moving safety volume follows the movements of the critical part along the movement path. The size of the moving safety volume is zero when the critical part stands still.

Figure 5:
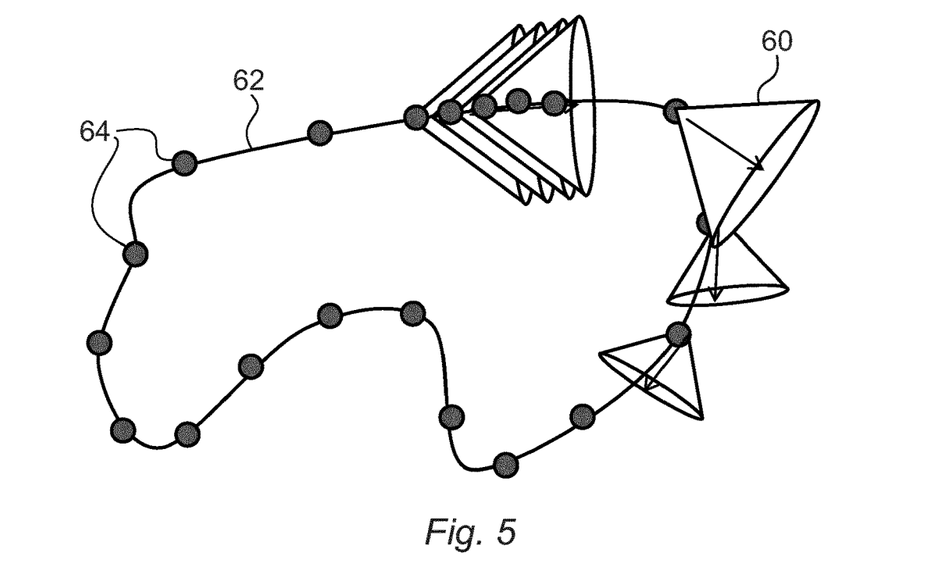
FIG. 5 shows an example of graphical presentation of a moving safety volume along a movement path.

FIG. 5 shows an example of graphical presentation of a moving safety volume 60 along a movement path 62 defined by a plurality of target points 64. The position and velocity is known along the movement path 62. Depending on the velocity, load etc. along the path there is a braking distance, i.e. safety distance. Depending on the uncertainties of the braking distance and direction, the braking distance can be represented as a volume, for example, in the form of a cone. This volume is denoted a moving safety volume. It is possible to determine a moving safety volume 60 along movement path 62. As seen in the figure the cones will "disappear" and instead be seen as a "tube". This tube can then be visualized through augmented reality.

Guidance for establishing a braking distance when an operator is approaching a stationary machine is given in ISO 13855. There, however, the motion of the robot is not accounted for. For the speed and separation monitoring type of operation, the primary equation used to determine the minimum separation distance S is, therefore, a generalization of the equation found in ISO 13855:

$$S = KH \times (TR + TB) + KR \times TR + B + C + Zs + Zr$$

The first term describes the distance travelled by the operator from the moment of detection until the robot system is halted, the second term represents the distance travelled by the robot from the moment of detection until the engagement of stopping means, the third term is the braking distance travelled by the robot during the halting process. Further information about the intrusion distance, C, can be found in ISO 13855.

Figure 6:
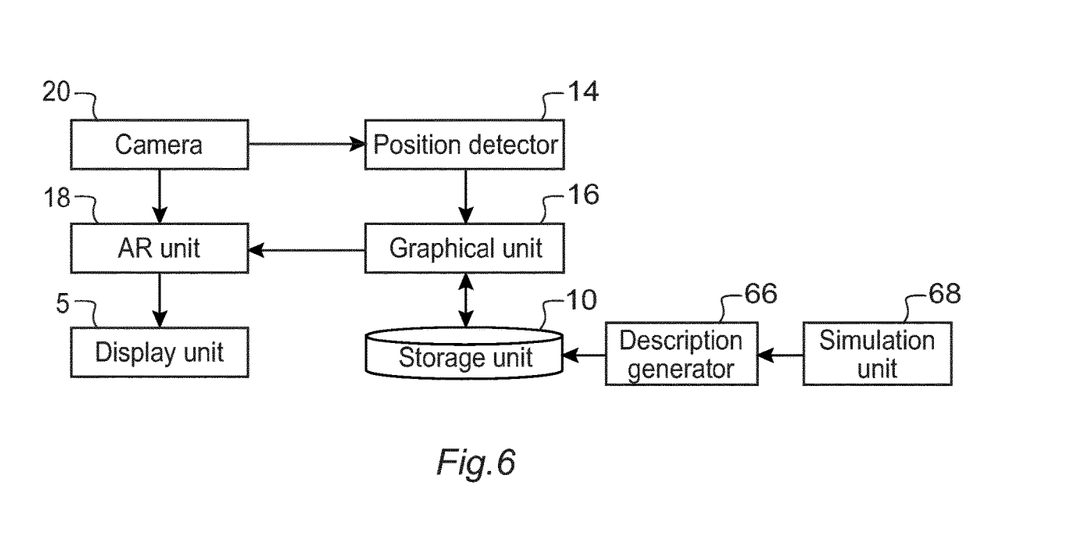
FIG. 6 shows a block diagram of a device for verifying safety volumes according to a second embodiment of the invention.

FIG. 6 shows a block diagram of a device for verifying safety volumes according to a second embodiment of the invention. Like or corresponding parts in FIGS. 3 and 6 are indicated with like numerals. The storage unit 10 is adapted to store descriptions moving safety volumes. This device shown in FIG. 6 differs from the device shown in FIG. 3 in that it comprises a description generator 66 configured to obtain positions and velocities of critical parts of the mechanical unit, to determine moving safety volumes for critical parts of the mechanical unit based on the positions and velocities of the critical parts, and to store descriptions of the braking-movement volumes defined in relation to the world coordinate system in the storage unit 10. The graphical unit 16 is configured to determine graphical representations of the moving safety volumes based on the descriptions of the moving safety volumes, and the position and orientation of the portable display unit. The augmented reality unit 18 is configured to overlay the graphical representations of the movable safety volumes on a view of the real environment of the mechanical unit to provide a composited augmented reality image. Thus, a graphical presentation of the moving safety volume is presented in relation to the real environment of the robot. This embodiment enables a user to visually determine if there is any overlap between the moving safety volume and an obstacle in the environment of the mechanical unit. If there is an overlap between the moving safety volume and the obstacle, there is a risk for collision between the mechanical unit and the obstacle and the movement path has to be reprogrammed.

It is possible to display only one moving safety volume, which is moving along the robot path. However, it is advantageous to simultaneously present several or all moving safety volumes along the path, for example as an elongated tube, in order to facilitate for the user to verify a programmed movement path with regard to collisions in the real environment of the mechanical unit.

The positions and velocities of the critical part are, for example, obtained from the robot controller 4. The robot program is then executed on the real robot while moving safety volumes for the critical part are determined based on the position, velocity, and optionally the load, of the real robot. The size and position of the moving safety volume is then determined based on the current position and velocity of the real robot.

Alternatively, the positions and velocities of the critical part are obtained from a simulation unit 68 configured to simulate the programmed movement path for the mechanical unit. The size and position of the moving safety volume are then determined based on the position and velocity of the critical part obtained from the simulation. It is suitable to locate the simulation unit in the portable display unit. However, the simulation unit can also be located on a remote computer, on the robot controller, or in the safety system. This embodiment makes it possible to verify a programmed movement path with regard to collisions in the real environment of the mechanical unit without having to move the mechanical unit. The graphical presentation of the moving safety volume is moved along the programmed path in the real environment, while the mechanical unit stands still. Due to the fact that the mechanical unit does not have to be moved, it is safe for the user to walk around in the environment of the mechanical unit, and to detect overlap between the moving safety volume and obstacles in the environment.

The device disclosed in FIG. 6 further comprises a simulation unit 68 configured to simulate the programmed movement path for the mechanical unit, and to determine the position and velocity of the critical part during execution of the movement path based on the simulation. The description generator 66 is configured to obtain the positions and velocities of the critical part along the movement path from the simulation unit 68 and to determine the moving safety volumes based on the obtained positions and velocities. The description generator 66 determines the braking distances along the path, for example, based on the velocity of the robot, the reaction time of the robot, and the mass of the robot and load carried by the robot.

In another embodiment of the invention, the storage unit 10 is adapted to store descriptions of the moving safety volumes as well as fixed safety volumes, and the graphical unit 16 is configured to determine graphical representations of the moving safety volumes as well as fixed safety volumes.

Figure 7:
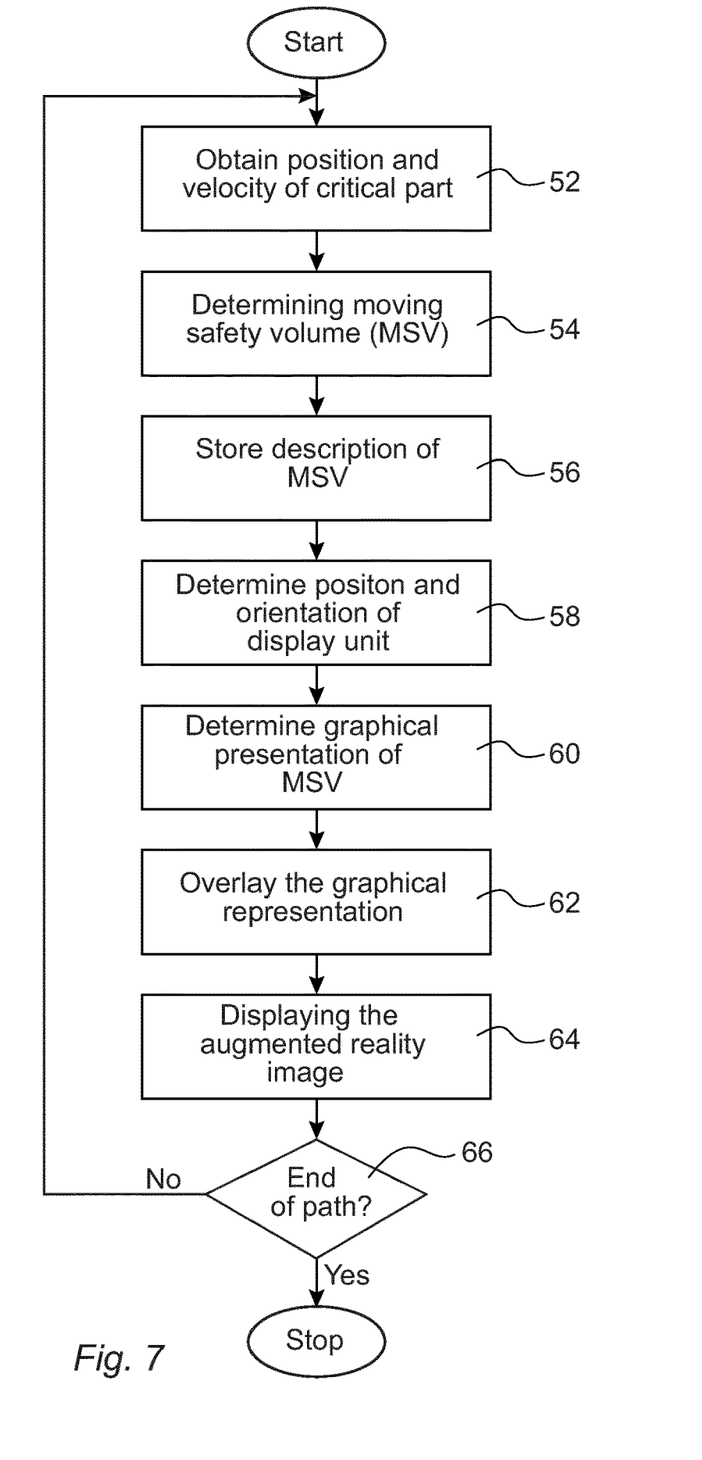
FIG. 7 shows a block scheme of a method for verifying moving safety volumes according to a second embodiment of the invention.

FIG. 7 shows a block scheme of a method for verifying moving safety volumes (MSV) according to a second embodiment of the invention. It will be understood that each block of the flow chart can be implemented by computer program instructions. The method comprises repeatedly:

Obtaining position and velocity of the critical part of the mechanical unit, block 52. The positions and velocities can be actual positions and velocities of the mechanical unit, or simulated values. Determining a moving safety volume for a critical part of the mechanical unit based on the obtained position and velocity of the critical part, block 54. This step includes determining the braking distance on the path based on the velocity of the mechanical unit. Storing a description of the moving safety volume defined in relation to the world-coordinate system, block 56. The description is, for example, the coordinates of the safety volume in the world-coordinate system. Determining position and orientation of a portable display unit in relation to the world-coordinate system, block 58. Determining a graphical representation of the moving safety volume based on the stored description of the moving safety volume and the position and orientation of the portable display unit, block 60. This means that a graphical presentation of the movable safety volume seen from the present position and angle of the display unit is determined.

The graphical representation of the moving safety volumes is overlaid a view of the real environment of mechanical unit to provide a composited augmented reality image, block 62. The augmented reality image is displayed on the portable display unit, block 64. The method is repeated until moving safety volumes have been displayed along the entire path, block 66. It is possible to continue to display all moving safety volumes along the path as long as the user chooses.

Figure 8:
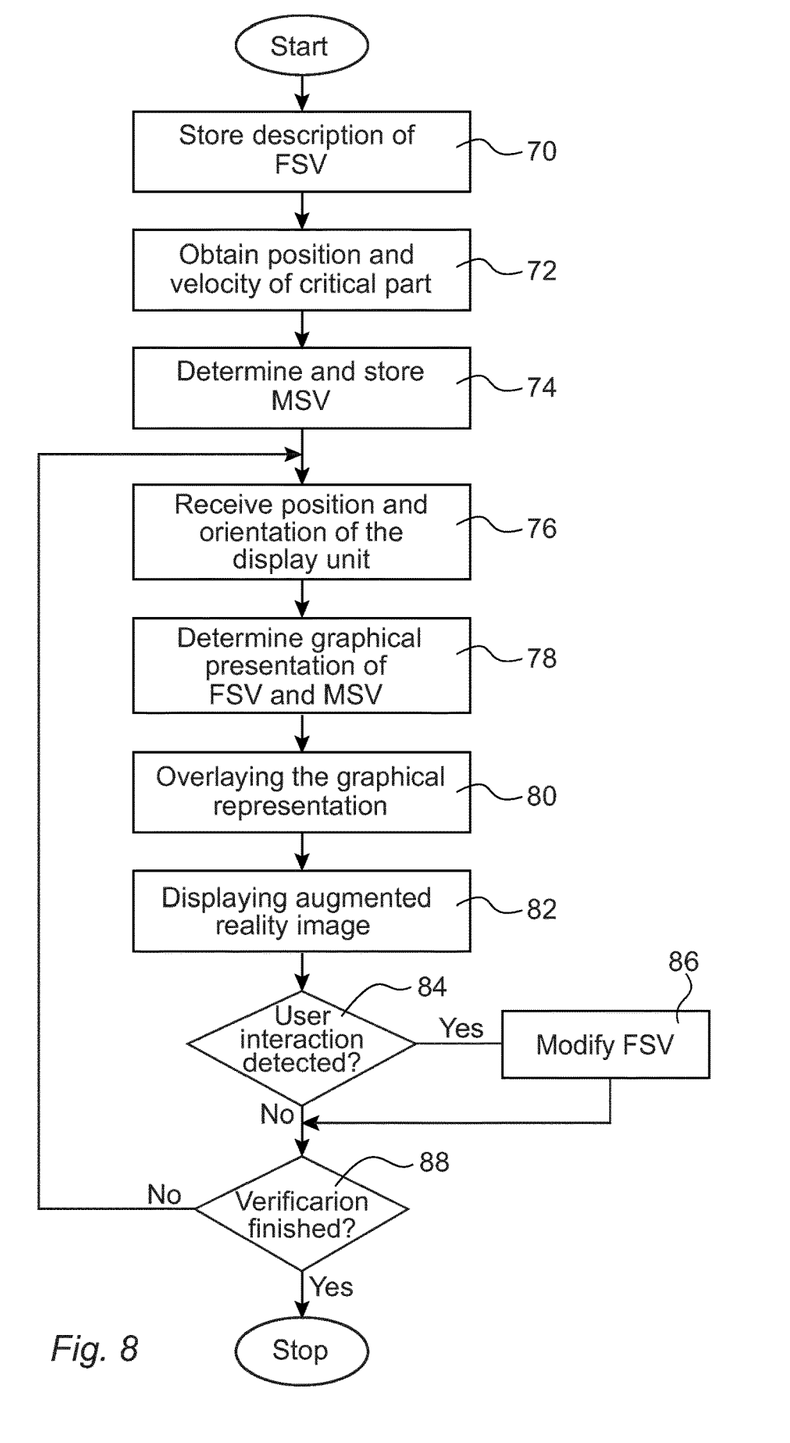
FIG. 8 shows a block scheme of a method for verifying safety volumes according to a third embodiment of the invention.

FIG. 8 shows a block scheme of a method for verifying fixed safety volumes according to a third embodiment of the invention. It will be understood that each block of the flow chart can be implemented by computer program instructions. One or more fixed safety volumes are defined for the movable mechanical unit in relation to the world coordinate system. Descriptions of the fixed safety volumes (FSV) defined in the world coordinate system are stored, block 70. Positions and velocities of a critical part of the mechanical unit are obtained, block 72. Moving safety volumes (MSV) for the critical part is determined along the entire path based on the obtained positions and velocities of the critical part 4. The descriptions of the moving safety volumes defined in the world coordinate system are stored, block 74.

During a first verification step, the following sub steps are repeatedly carried out. The present position and orientation of a portable display unit is determined in relation to the world-coordinate system, block 76. A graphical representation of the fixed and moving safety volumes are determined based on the stored descriptions of the fixed and moving safety volumes and the position and orientation of the portable display unit, block 78. This means that a graphical representation of the fixed and movable safety volumes as seen from the present position and angle of the display unit is determined. The graphical representation of the fixed and moving safety volumes is overlaid a view of the environment of mechanical unit to provide a composited augmented reality image, block 80.

The augmented reality image is displayed on the portable display unit, block 82. The fixed and moving safety volumes are thereby visualized in the real environment of the robot. By displaying one or more fixed safety volumes simultaneously and in the same view as one or more moving safety volumes it is possible to visually verify the position of a fixed safety volume in relation to the movement path. Depending on the positional relation between the visualized fixed and movable safety volumes it is possible for a user to detect improvements of the fixed safety volumes and make necessary modifications of the fixed safety volume. For example, if the robot is only allowed to move inside the fixed safety volume and the distance between the fixed safety volume and the moving volume is large along the entire path, the size of the fixed safety volume can be reduced and thereby a higher utilization of the space in a factory can be achieved. If the safety volume and the fixed safety volume instead cease to overlap each other on a part of the robot path, it is necessary to change the size of the fixed safety volume or change the programmed movement path to prevent the mechanical unit from reaching the border of the fixed safety volume during execution of the programmed path and by that being emergency stopped. Optionally, the method may include the steps of detecting user interactions with the graphical representation of the fixed safety volume, block 84, and modifying the description of the fixed safety volume based on said detected user interactions, 86. Thus, it is possible for a user to modify the shape and position of the fixed safety volume during verification of the safety volumes, for example, by interacting with a touch screen on the display unit. The steps in blocks 76-86 are repeated until the user has finished the verification, block 88. In order to finally verify the fixed safety volumes, the second verification step previously described can be carried out.

Figure 9:
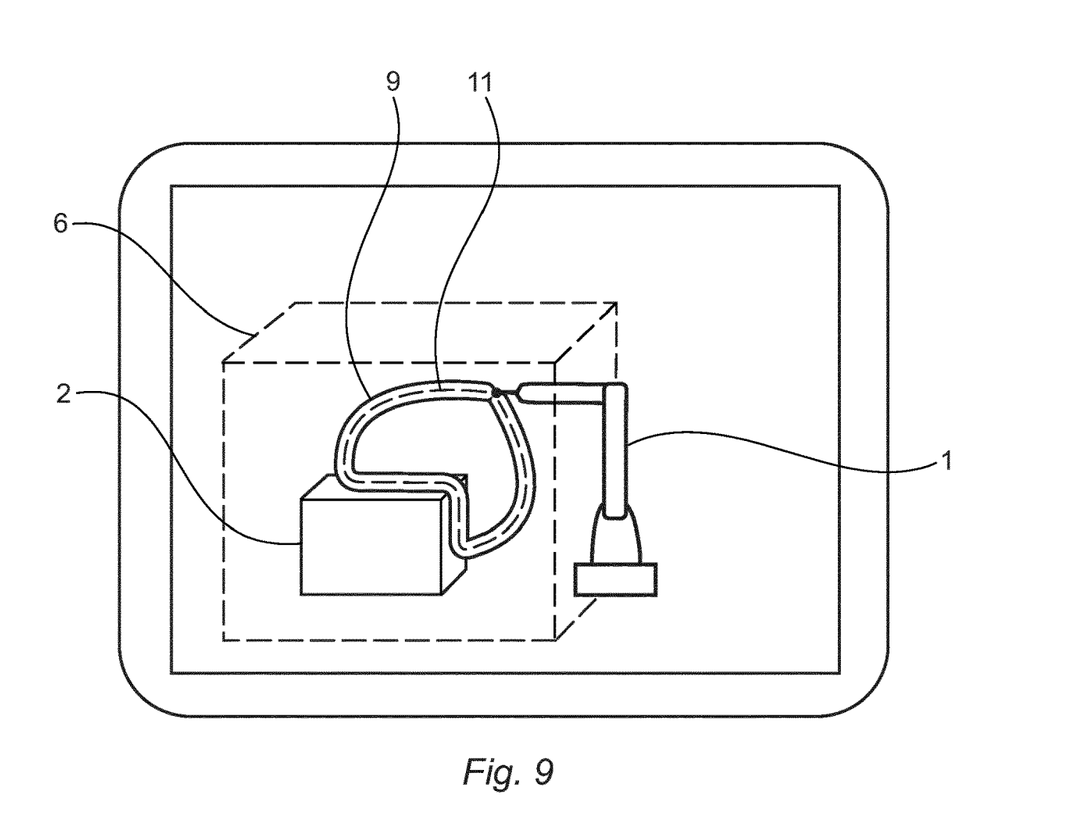
FIG. 9 shows an example of an augmented reality image including a graphical representation of a fixed safety volume and a moving safety volume presented on top of a real robot cell.

FIG. 9 shows an example of an augmented reality image including a graphical representation of a fixed safety volume 6 and a moving safety volume 9 presented on top of a real robot cell disclosed in FIG. 1. In this example, the fixed safety volume 6 is shaped as a cuboid and the moving safety volume 9 is tube shaped. The moving safety volume 9 encloses a programmed movement path 11.

The present invention is not limited to the embodiments disclosed but may be varied and modified within the scope of the following claims. For example, the graphical unit and/or the augmented reality unit can be located outside the portable display unit, for instance, on an external server or as a cloud service. The simulator unit can also be located outside the portable display unit, for instance, on the robot controller, or an external server.

The invention claimed is:

1. A method for verifying one or more safety volumes for a mechanical unit with respect to an environment of the mechanical unit, wherein the mechanical unit is moveable and a world-coordinate system is defined in relation to the mechanical unit and in relation to the environment of the mechanical unit, the method comprising:
   storing a description of one or more safety volumes defined in relation to the world-coordinate system, and repeatedly:
   determining a position and an orientation of a portable display unit in relation to the world-coordinate system;
   determining a graphical representation of the safety volumes based on the description of the safety volumes and the position and the orientation of the portable display unit;
   overlaying the graphical representation of the safety volumes on a view of a real environment of the mechanical unit to provide a composited augmented reality image; and
   displaying the augmented reality image on the portable display unit;
   wherein at least one of said safety volumes is a moving safety volume having a size and position that depends on a velocity and a position of a critical part of the mechanical unit;
   wherein the method further comprises repeatedly:
   obtaining the velocity and the position of the critical part of the mechanical unit;
   determining the moving safety volume for the critical part of the mechanical unit based on the velocity and the position of the critical part; and
   storing a description of the moving safety volume defined in relation to the world-coordinate system.

2. The method according to claim 1, wherein at least one of said safety volumes is a fixed safety volume having a fixed position in relation to the world-coordinate system.

3. The method according to claim 2, wherein the method comprises verifying the fixed safety volume based on the displayed augmented reality image and modifying the fixed safety volume upon detecting an incorrect safety volume.

4. The method according to claim 2, wherein the method comprises detecting user interactions with the graphical representation of the fixed safety volume, and modifying a description of the fixed safety volume based on said user interactions.

5. The method according to claim 4, wherein the method comprises detecting user interactions with the graphical representation of the fixed safety volume, and modifying a description of the fixed safety volume based on said user interactions.

6. The method according to claim 2, wherein the method comprises verifying the fixed safety volume based on the displayed augmented reality image and modifying the fixed safety volume upon detecting an incorrect safety volume.

7. The method according to claim 1, wherein the method comprises:
   simulating a programmed movement path for the mechanical unit;
   determining the position and the velocity of the critical part along the programmed movement path based on the simulation; and
   determining said moving safety volume based on the position and the velocity of the critical part.

8. The method according to claim 7, wherein the method comprises:
   calculating a safety distance for said critical part based on velocity and load of the critical part; and
   determining said moving safety volume based on the calculated safety distance.

9. The method according to claim 1, wherein the method comprises:
- calculating a safety distance for said critical part based on the velocity and load of the critical part; and
- determining said moving safety volume based on the calculated safety distance.

10. The method according to claim 1, wherein at least one of said safety volumes is a fixed safety volume and at least one of said safety volumes is a moving safety volume, and the method comprises repeatedly:
- determining a graphical representation of each of the fixed safety volume and the moving safety volume based on the descriptions of the safety volumes and the position and the orientation of the portable display unit;
- overlaying the graphical representations of the fixed safety volume and the moving safety volume on said view of the real environment to provide a composited augmented reality image; and
- displaying the augmented reality image on the portable display unit.

11. A device for verifying one or more safety volumes for at least one mechanical unit positioned in an environment, wherein the mechanical unit is movable and a world coordinate system is defined in relation to the mechanical unit and in relation to the environment of the mechanical unit, the device comprising:
- a storage unit for storing descriptions of the safety volumes;
- a portable display unit;
- a position detector configured to continuously determine a position and an orientation of the portable display unit in relation to the world coordinate system;
- a graphical unit configured to determine graphical representations of the safety volumes based on the stored descriptions of the safety volumes and the position and the orientation of the portable display unit; and
- an augmented reality unit configured to overlay the graphical representations of the safety volumes on a view of a real environment of mechanical unit to provide a composited augmented reality image, and to display the augmented reality image on the portable display unit;
- wherein the device comprises a description generator configured to obtain positions and velocities of a critical part of the mechanical unit, to determine a moving safety volume for the critical part of the mechanical unit, the moving safety volume having a size and a position that depends on a velocity and a position of the critical part, and to store a description of the moving safety volume defined in relation to the world coordinate system in said storage unit.

12. The device according to claim 11, wherein the device comprises a simulation unit configured to simulate a programmed movement path for the mechanical unit, and to determine the position and the velocity of the critical part during execution of the movement path based on the simulation, and said description generator is configured to obtain the position and the velocity of the critical part from the simulation unit and to determine said moving safety volume based on the position and the velocity.

13. The device according to claim 12, wherein said storage unit is configured to store descriptions of fixed safety volumes having fixed position in relation to the world coordinate system, said graphical unit is configured to determine graphical representations of the fixed safety volumes and the moving safety volume based on the descriptions of the safety volumes and the position and the orientation of the portable display unit, and the augmented reality unit is configured to overlay the graphical representations of the fixed and moving safety volume on the view of the real environment to provide a composited augmented reality image.

14. The device according to claim 11, wherein said storage unit is configured to store descriptions of fixed safety volumes having fixed position in relation to the world coordinate system, said graphical unit is configured to determine graphical representations of the fixed safety volumes and the moving safety volume based on the descriptions of the safety volumes and the position and the orientation of the portable display unit, and the augmented reality unit is configured to overlay the graphical representations of the fixed and moving safety volume on the view of the real environment to provide a composited augmented reality image.

15. The device according to claim 11, wherein said storage unit is configured to store descriptions of fixed safety volumes having fixed position in relation to the world coordinate system, and the device comprises an interaction unit configured to detect user interactions with the graphical representations of the fixed safety volumes, and a modification unit configured to modify the stored description of the fixed safety volumes based on the user interactions.

16. The device according to claim 11, wherein the device comprises a camera configured to capture an image of the mechanical unit and its environment, and the augmented reality unit is configured to register the graphical representations of the safety volumes on the image of a real mechanical unit and its environment to provide a composited augmented reality image.

17. The device according to claim 11 for verification of safety volumes for an industrial robot.

* * * * *